(12) United States Patent
Matsuda et al.

(10) Patent No.: US 7,559,308 B2
(45) Date of Patent: Jul. 14, 2009

(54) ENGINE FOR LEISURE VEHICLE

(75) Inventors: Yoshimoto Matsuda, Kobe (JP); Sosuke Kinouchi, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 11/453,294

(22) Filed: Jun. 13, 2006

(65) Prior Publication Data

US 2006/0283418 A1 Dec. 21, 2006

(30) Foreign Application Priority Data

Jun. 17, 2005 (JP) ............................. 2005-177855

(51) Int. Cl.
*F02B 75/32* (2006.01)
*F02F 7/00* (2006.01)

(52) U.S. Cl. ........................... 123/197.1; 123/195 AC; 123/198 P

(58) Field of Classification Search .............. 123/197.1, 123/195 R, 195 H, 195 HC, 198 P, 195 AC
See application file for complete search history.

(56) References Cited

U.S. PATENT DOCUMENTS

| | | | | |
|---|---|---|---|---|
| 4,476,951 A | * | 10/1984 | Ito .............................. 180/219 |
| 4,558,667 A | * | 12/1985 | Inagaki et al. ............. 123/90.44 |
| 4,618,019 A | * | 10/1986 | Ando et al. .................. 180/219 |
| 4,658,769 A | * | 4/1987 | Horio et al. ............... 123/90.31 |
| 4,714,061 A | * | 12/1987 | Nakayama et al. ...... 123/195 R |
| 4,716,864 A | * | 1/1988 | Binder ..................... 123/90.31 |
| 4,821,826 A | * | 4/1989 | Lings .......................... 180/58 |
| 4,878,469 A | * | 11/1989 | Hayashi et al. .......... 123/195 A |
| 5,014,812 A | * | 5/1991 | Kazama ...................... 180/292 |
| 5,231,894 A | * | 8/1993 | Okita et al. ............... 74/606 R |
| 5,413,014 A | * | 5/1995 | Kameda et al. ........... 74/606 R |
| 5,439,585 A | * | 8/1995 | Arakawa ................ 210/167.04 |
| 5,606,944 A | * | 3/1997 | Kurihara .................. 123/90.31 |
| 6,397,810 B2 | * | 6/2002 | Ohyama et al. ........... 123/192.2 |
| 6,467,562 B2 | * | 10/2002 | Laimbock .................... 180/219 |
| 6,510,827 B2 | * | 1/2003 | Schreeck et al. ......... 123/90.17 |
| 6,591,934 B2 | * | 7/2003 | Tsutsumikoshi ............ 180/291 |
| 6,951,196 B2 | * | 10/2005 | Wenger et al. ............ 123/90.31 |
| 7,174,867 B2 | * | 2/2007 | Gokan et al. ............. 123/90.31 |
| 2007/0095305 A1 | * | 5/2007 | Matsuda .................. 123/41.31 |
| 2007/0101966 A1 | * | 5/2007 | Matsuda .................. 123/195 R |

FOREIGN PATENT DOCUMENTS

| | | |
|---|---|---|
| JP | 60-116825 | 6/1985 |
| JP | 05-079347 | 3/1993 |
| JP | 2004/218507 | 8/2004 |

* cited by examiner

*Primary Examiner*—Hai H Huynh
(74) *Attorney, Agent, or Firm*—Alleman Hall McCoy Russell & Tuttle LLP

(57) ABSTRACT

An engine for a leisure vehicle including a crank chamber in which a crankshaft is disposed, a transmission chamber in which a transmission unit of the vehicle is disposed, the transmission unit having an input shaft that is coupled to the crankshaft and configured to be driven by the crankshaft, a cylinder extending from the crank chamber, and a cylinder head attached to the cylinder. The crank chamber is located above the transmission chamber, and the cylinder is disposed in such a manner that an axial direction thereof is oriented in a substantially longitudinal direction of a vehicle body of the leisure vehicle.

14 Claims, 13 Drawing Sheets

ENGINE FOR LEISURE VEHICLE

TECHNICAL FIELD

The present invention relates to an engine for a leisure vehicle such as a motorcycle, an all terrain vehicle, a utility vehicle, or a personal watercraft.

BACKGROUND OF THE INVENTION

In a leisure vehicle such as a motorcycle, cylinders of an engine are typically arranged to extend substantially vertically, namely in a substantially upright position. Especially in a multi-cylinder engine of the leisure vehicle, the cylinders extending substantially vertically are arranged in-line transversely, i.e., in a width direction of a vehicle body of the vehicle (see Japanese Laid-Open Patent Application Publication No. Hei. 5-79347). Such a transverse-mounted in-line engine is able to advantageously reduce a mechanical loss, because a drive system such as a valve system has a simple construction, in contrast to a V-type engine in which cylinders are arranged in V-shape. Nonetheless, when a transverse-mounted in-line engine is equipped in a motorcycle, the longitudinal direction of the cylinders is in the vertical direction, and a projected area of the engine as viewed from the front, that is, a frontal-projected area of the engine, increases, and as a result air resistance increases.

In a transverse-mounted in-line engine that employs a water cooling system, a space between a radiator disposed forward of the engine and a front end of the engine becomes small. To extend an exhaust pipe from an opening end of an exhaust port of the engine that opens forward, it is necessary to curve the exhaust pipe from forward to downward and from downward to rearward with small curvature radiuses. In this case, a pressure loss and hence a fluid resistance of the exhaust pipe increase, decreasing exhaust efficiency. In addition, cooling efficiency of the radiator is likely to decrease because the radiator is subjected to heat radiated from the exhaust pipe located behind the radiator. If the exhaust pipe or the engine (cylinder, etc.) is positioned behind and near the radiator, an amount of cooling air flow passing through the radiator from forward to rearward decreases, decreasing cooling efficiency of the radiator.

Since the cylinders are arranged to extend substantially vertically in the above transverse-mounted in-line engine, a vertical dimension of the engine increases, and thus, a vertical space in an area where the engine is disposed is limited.

In an engine including the cylinders arranged to extend substantially vertically, pistons vertically reciprocate, causing vertical vibration to occur in the engine. A rider riding on the vehicle feels the vertical vibration. To reduce the vertical vibration, some engines have a counterweight mounted to counteract the reciprocation of the piston. In such an engine, a weight of movable components increases, causing slow acceleration and deceleration. This is unfavorable to a high-speed engine which requires high-speed response.

In motorcycles, if the position of the engine is greatly changed to solve the above mentioned problem, then the center of gravity of the motorcycle is correspondingly changed. If the center of gravity of the engine is greatly changed, then braking characteristics or cornering characteristics of the motorcycle may change. For this reason, the ability to change the position of the engine is limited.

SUMMARY OF THE INVENTION

The present invention addresses the above described conditions, and an object of the present invention is to provide an engine for a leisure vehicle that is able to decrease a frontal-projected area of the engine and to improve exhaust efficiency and air-intake efficiency without substantially changing the center of gravity of the engine with respect to a vehicle body of the leisure vehicle.

According to the present invention, there is provided an engine for a leisure vehicle comprising a crank chamber in which a crankshaft is disposed; a transmission chamber in which a transmission unit of the vehicle is disposed, the transmission unit having an input shaft that is coupled to the crankshaft and configured to be driven by the crankshaft; a cylinder extending from the crank chamber; and a cylinder head attached to the cylinder; wherein the crank chamber is located above the transmission chamber, and the cylinder is disposed in such a manner that an axial direction thereof, i.e., a reciprocation direction thereof, is oriented in a substantially longitudinal direction of a vehicle body of the leisure vehicle, i.e., direction in which the leisure vehicle is traveling. The axial direction of the cylinder may be substantially horizontal or may be tilted upward to form a predetermined angle from horizontal on the cylinder head side.

In the engine for the leisure vehicle, since the axial direction of the cylinder is oriented in the substantially longitudinal direction of a vehicle body of the leisure vehicle, the vertical dimension of the cylinder can be reduced. Therefore, a projected area of the engine as viewed from forward, that is, a frontal-projected area, can be reduced. The leisure vehicle equipped with the engine constructed above is able to reduce air resistance during travel. In addition, if required, a minimum ground clearance of the leisure vehicle may be increased. This is favorable to an off-road motorcycle.

In the above construction, the crankshaft disposed in the crank chamber is located higher but the center of gravity of the cylinder and the cylinder head is located lower. Therefore, the center of gravity of the whole engine is substantially identical to that of the conventional in-line engine. So, the rider is able to enjoy travel as in the conventional motorcycle. In addition, since heavy components such as the cylinder head, the crankshaft and the like are positioned near the center of gravity of the whole engine, the rider is able to easily steer the motorcycle.

In the above construction, since the reciprocation direction of the piston substantially conforms to the longitudinal direction of the vehicle body of the leisure vehicle, the rider feels the vibration of the engine less. Generally, the rider riding on the motorcycle is able to feel vibration generated in the vertical direction but is less sensitive to vibration generated in a forward and backward direction. So, a counterweight mounted in the conventional engine to reduce the vertical vibration may be in some cases omitted, so that a weight of the movable components is reduced. As a result, the engine improves responsiveness and becomes lightweight.

In the above structure, by orienting the exhaust port of the cylinder head downward, the exhaust pipe having a rear end portion extending rearward can be curved with a large curvature radius and a small bending angle. Thereby, the pressure loss of the exhaust pipe can be reduced, and the exhaust efficiency of the engine can be improved. By orienting the intake port of the cylinder head upward and by disposing the air-intake device, for example, a throttle body, above the engine, the air-intake device can be coupled to the intake port of the cylinder head so as to form a straight air-intake passage extending substantially vertically. As a result, air-intake resistance can be reduced and air-intake efficiency of the engine can be improved.

Furthermore, in the above structure, a region of the engine having a largest width, where the crankshaft is mounted, is located higher, and a lower part of the engine can be formed to have a smaller width, in contrast to the conventional in-line engine. Therefore, in the motorcycle, a larger bank angle can be obtained.

The leisure vehicle may be a motorcycle, and the cylinder may be disposed in such a manner that the axial direction thereof is substantially parallel to a longitudinal direction of a main frame of the motorcycle in a side view, the main frame being configured to extend above the engine in a longitudinal direction of the motorcycle. In such a construction, since the vibration of the engine is absorbed by the main frame of the motorcycle having high rigidity and is thereby reduced, the rider is less sensitive to the vibration.

The engine may further comprise an auxiliary device of the engine, for example, a turbo charger, that is disposed in a space formed below the cylinder head and forward of the transmission chamber. Thus, the space formed below the cylinder head and forward of the transmission is effectively utilized. Especially in the engine in which the exhaust port of the engine is oriented downward, if the turbo charger is disposed below the cylinder head and forward of the transmission chamber, and therefore is located near the exhaust port of the engine, then the exhaust gas is efficiently guided to the turbo charger. If a catalytic device for cleaning the exhaust gas is disposed below the cylinder head and forward of the transmission chamber, then exhaust gas with an elevated temperature may be introduced into the catalytic device. As a result, the catalytic device is able to clean the exhaust gas effectively.

The auxiliary device may be at least one of the catalytic device for cleaning an exhaust gas emitted from the engine, the turbocharger, a starter motor, a generator, a battery, an oil cooler, an oil filter, an air filter device, and an oil tank. Alternatively, at least one component other than these types of auxiliary devices may be disposed below the cylinder head and forward of the transmission chamber.

The main frame of the motorcycle may include a monocoque frame having a hollow space in which an air box is disposed. Fresh air may be supplied to the air-intake device through the air box and an intake pipe, and an end of the intake pipe that is located on an opposite side of the air-intake device is opened in the air box. In this construction, the hollow space of the frame is effectively utilized.

The engine may be an in-line multi-cylinder four-cycle engine.

An exhaust port may be formed on a lower region of the cylinder head and an intake port may be formed on an upper region of the cylinder head. Or, the exhaust port may be formed on the upper region of the cylinder head and the intake port may be formed on the lower region of the cylinder head. In this construction, the exhaust pipe, which has a rear end portion extending rearward, can be curved with a large curvature radius and with a small bending angle.

The transmission chamber and the crank chamber located thereabove may be formed in a case having a transmission case portion forming an outer shell of the transmission chamber and a crankcase portion forming an outer shell of the crank chamber, and these chambers may be spatially connected to each other. A lid member may be removably attached to an opening that is formed on a rear end surface of the transmission case portion of the case so as to face the crank chamber. The crankcase portion of the case may have a parting plane configured to pass through a center of the crankshaft of the engine. In this construction, the engine can be easily assembled and disassembled. As a result, productivity of the engine increases and maintenance of the engine becomes easy.

The engine may be an in-line multi-cylinder four-cycle engine. A driven cam sprocket may be mounted on the camshaft in an interior of the cylinder head and positioned closer to a center of the engine than an end cylinder located at an end in the width direction of the engine, a drive cam sprocket may be mounted on a cam drive shaft disposed to be spaced forward apart from the crankshaft of the engine, and a chain may be installed around the driven cam sprocket and the drive cam sprocket to allow a drive force to be transmitted from the cam drive shaft to the camshaft through the chain. In this construction, a cam chain tunnel or the like formed at a side end region of the conventional multi-cylinder engine may be omitted. As a result, the width of the engine or the cylinder head can be reduced.

The drive force may be transmitted from the crankshaft to the cam drive shaft through the input shaft of the transmission.

The above and further objects and features of the invention will more fully be apparent from the following detailed description with accompanying drawings.

DETAILED DESCRIPTION OF THE PREFERRED EMBODIMENTS

Hereinafter, an engine for a leisure vehicle according to embodiments of the present invention will be described with reference to the accompanying drawings. First of all, an engine for a motorcycle which is one type of the leisure vehicle will be described.

Figure 1:
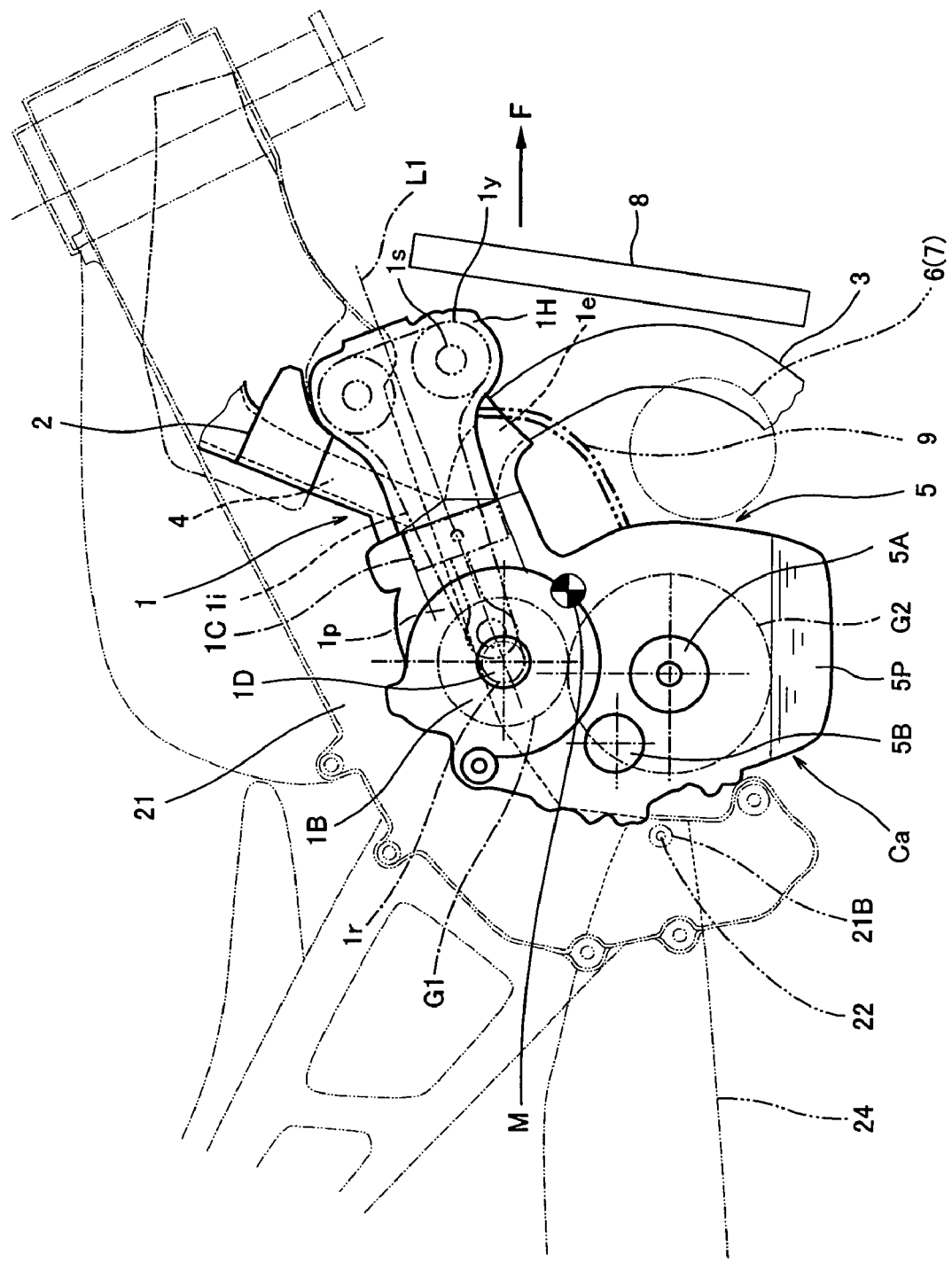
FIG. 1 is a side view schematically showing a construction of an engine for a motorcycle according to an embodiment of the present invention.

Turning now to FIG. 1, an engine 1 is a transverse-mounted in-line four-cylinder engine including cylinders arranged transversely, i.e., in a width direction of a vehicle body of a motorcycle having a double cradle type frame. The engine of the present invention is not limited to the four-cylinder engine but may be a transverse-mounted in-line two-cylinder engine or a transverse-mounted in-line three-cylinder engine or otherwise may be a single-cylinder engine.

Figure 4:
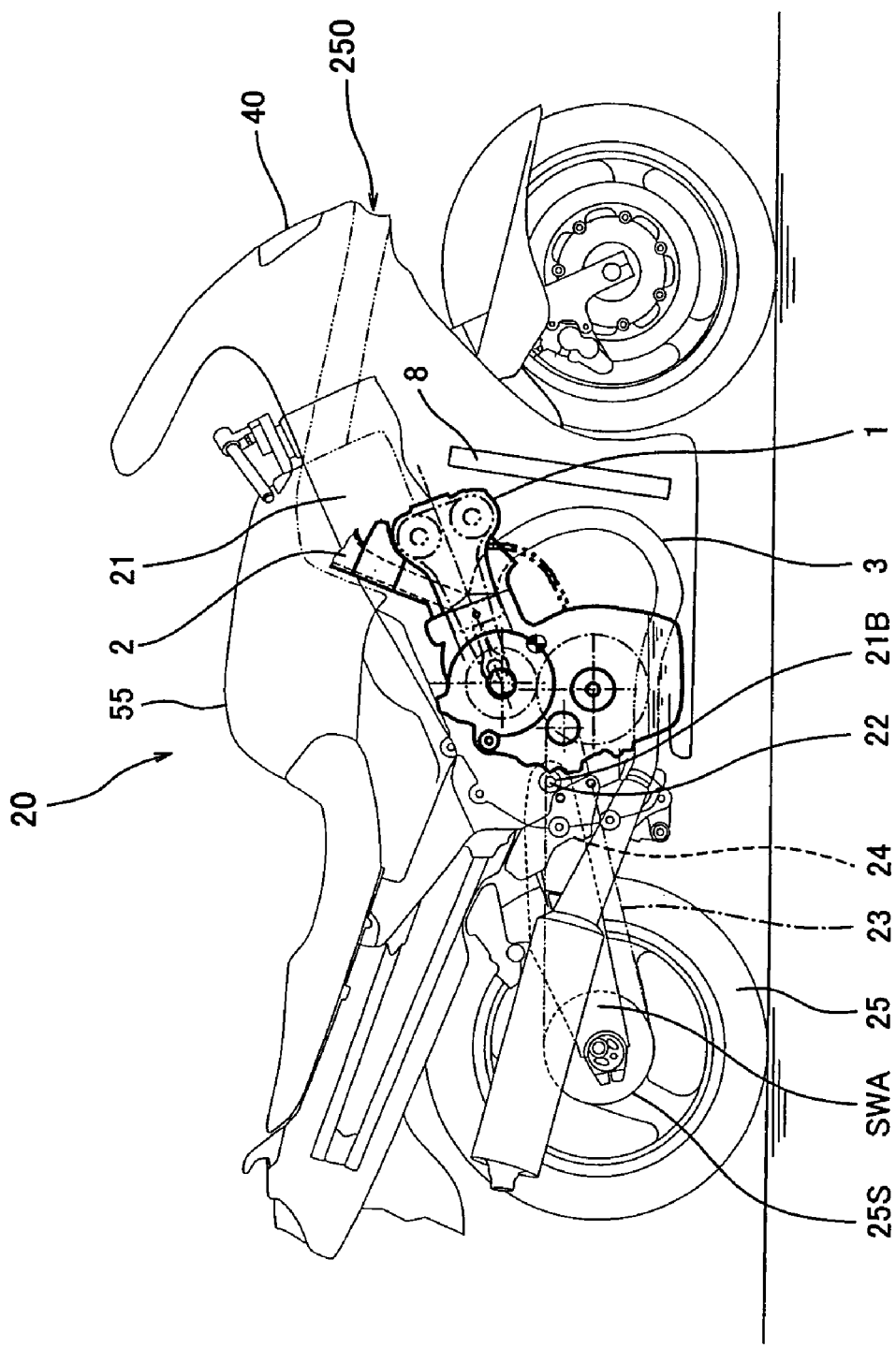
FIG. 4 is a side view of a motorcycle in which the engine of FIG. 1 is mounted.

As shown in FIG. 4, the engine 1 is disposed below a main frame 21 of a motorcycle 20 in such a manner that an axial direction, namely, an axis L1 of a cylinder 1C of the engine 1 is substantially parallel to a longitudinal direction of the main frame 21 in a side view. The main frame 21 extends above the engine 1 in a longitudinal direction of the motorcycle 20. The motorcycle 20 equipped with the engine 1 of FIG. 4 has the double cradle type frame, and a predetermined part thereof is covered with a cowling.

Turning to FIG. 1, the engine 1 is integral with a transmission 5, but may alternatively be separable from the transmission 5. In this embodiment, a crank chamber 1B of the engine 1 is disposed substantially right above the transmission 5. The transmission 5 includes a transmission chamber 5C and a transmission unit having gear trains in the transmission chamber 5C. As used herein, the term "above" is meant to include obliquely above as well as right above. To be specific, a crankshaft 1D is required to be positioned above an input shaft 5A and an output shaft 5B of the transmission 5. In this embodiment, the crankshaft 1D in the crank chamber 1B is positioned right above the input shaft 5A of the transmission 5. The crank chamber 1B and the transmission chamber 5C are formed together in a case Ca which forms an outer shell of both the crank chamber 1B and the transmission chamber 5C.

Figure 2:
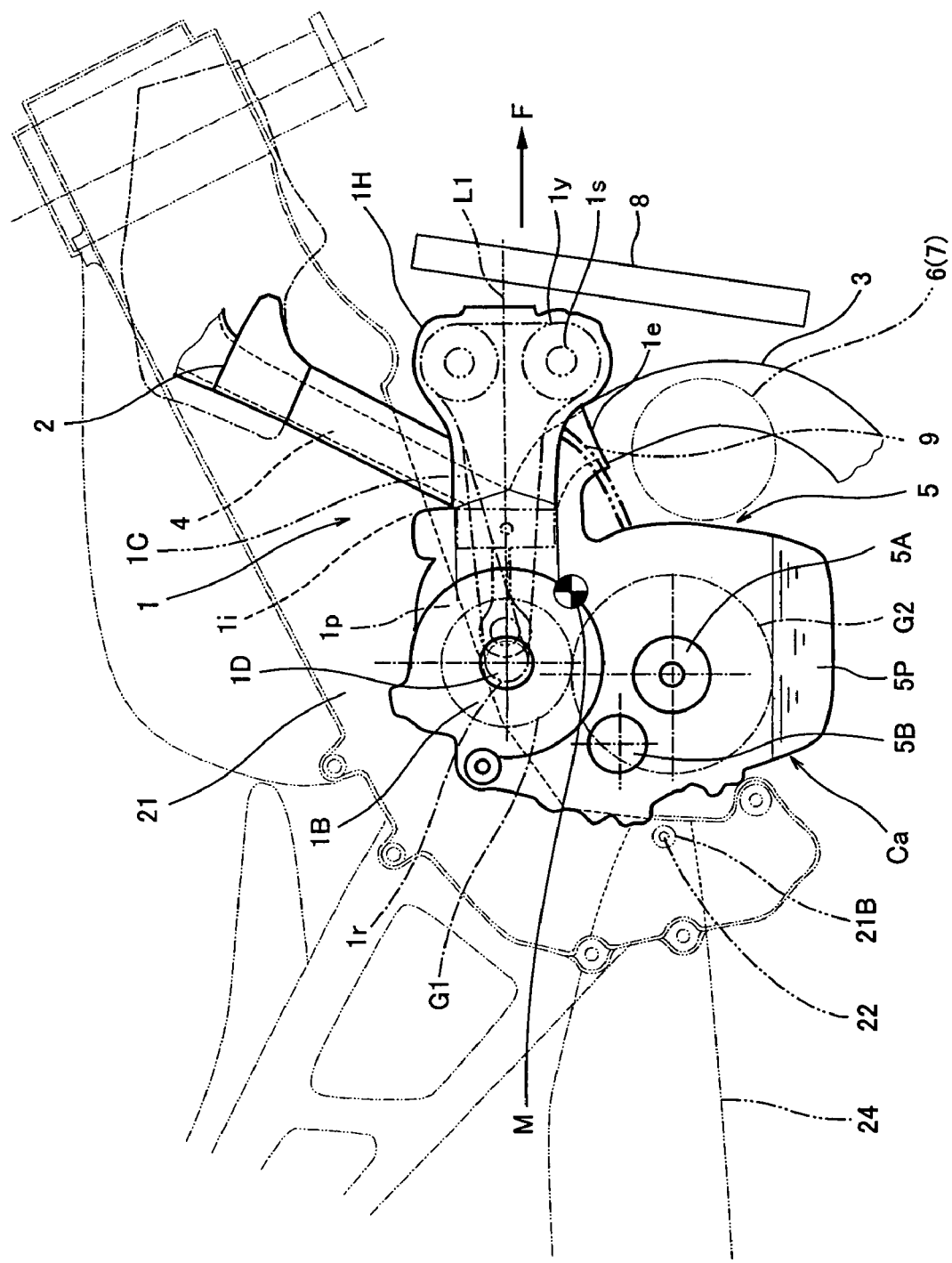
FIG. 2 is a side view schematically showing a construction of an engine for a motorcycle according to another embodiment of the present invention, in which an axial direction of cylinders is horizontal.

The cylinder 1C and a cylinder head 1H are disposed adjacent to each other to extend obliquely forward of the vehicle body of the motorcycle 20 from the crank chamber 1B so as to form an angle of about 10 to 20 degrees so that the cylinder 1C is tilted slightly upward on the cylinder head 1H side. The cylinder 1C and the cylinder head 1H may be disposed horizontally as shown in FIG. 2 or otherwise to form an angle smaller or larger than 10 to 20 degrees. In FIG. 2, the same reference numbers as those in FIG. 1 denote the same or corresponding parts.

An intake port 1i is formed on an upper region of the cylinder head 1H and an air-intake device 2, for example, a throttle body, is disposed above and adjacent the intake port 1i. As indicated by a broken line in FIG. 1, an air-intake passage 4 is formed to extend substantially straight from the air-intake device 2 to the intake port 1i to allow fresh air to flow straight downward. In this embodiment, an injector (not shown) is attached to an interior of the air-intake device 2 or the air-intake passage 4 to inject a fuel.

An exhaust port 1e is formed on a lower region of the cylinder head 1H. An upstream end of the exhaust pipe 3 is coupled to the exhaust port 1e. The exhaust pipe 3 is curved with a curvature radius that is approximately four to fifteen times as large as that of the conventional transverse-mounted in-line four-cylinder engine and with a bending angle, for example, of 100 degrees, which is smaller than, for example, the bending angle of about 180 degrees found in conventional engines. A downstream end of the exhaust pipe 3 extends rearward (leftward in FIG. 1) of the vehicle body of the motorcycle 20.

The input shaft 5A of the transmission 5 is coupled to the crankshaft 1D by a pair of gears G1 and G2. The input shaft 5A is coupled to the output shaft 5B of the transmission 5 by reduction gear trains (not shown) that are capable of changing a reduction gear ratio. The output shaft 5B is coupled to a rear wheel 25 (see FIG. 4) of the motorcycle 20 through a sprocket and a chain (not shown). The rear wheel 25 may alternatively be driven by a drive shaft.

As shown in FIG. 1, in this embodiment, a generator 6 is disposed separately in front of the transmission 5. Alternatively, the generator 6 may be integral with the transmission 5 in the case Ca. Since the generator 6 having a relatively large weight is disposed in front of the transmission 5, i.e., at a lower position, stability of the motorcycle 20 is improved. The generator 6 may alternatively be disposed above the crank chamber 1B, although not shown. In such a construction, so-called gyroscopic precession caused by rotation of the generator 6 occurs near the rider. As a result, performance of the motorcycle 20 is improved.

As shown in FIG. 4, a swing arm 24 is mounted to a pivot hole 21B formed at a rear end of the main frame 21 of the motorcycle 20 to be vertically pivotable around a pivot shaft 22. The rear wheel 25 is rotatably attached to a rear end portion of the swing arm 24.

The engine 1 and the transmission 5 are positioned forward of the pivot shaft 22. A drive force is transmitted from a drive sprocket (not shown) mounted on the output shaft 5B of the transmission 5, through a chain 23, to a driven sprocket 25S mounted to be rotatable integrally with the rear wheel 25. Thereby, the motorcycle 20 is able to travel.

As shown in FIGS. 1 and 4, in the motorcycle 20, the entire air-intake device 2 and ½ to ⅓ of upper portions of the cylinder head 1H and the cylinder 1C are located between right and left frame members of the main frame 21.

The engine 1 employs a water-cooling system. As shown in FIG. 4, a radiator 8 is mounted forward of a lower portion of the cylinder head 1H and the exhaust pipe 3 and is configured to cool cooling water that has cooled the engine 1 and has elevated in temperature by using cooling air. In the motorcycle 20 of this embodiment, as shown in FIG. 1, there is sufficient space in a region behind the radiator 8 from an upper end of the radiator 8 to a lower end of the radiator 8. In addition, the cylinder 1C and the cylinder head 1H are not in the upright position or close to the radiator 8, unlike in the conventional engine. In this construction, during travel of the motorcycle 20, cooling air flowing from forward smoothly passes through the radiator 8. Thus, a high cooling effect is achieved. In FIG. 1, reference symbol F denotes forward in the direction in which the motorcycle 20 is traveling.

After lubricating and cooling the cylinder head 1H, oil returns from the cylinder head 1H toward the transmission 5 through a return pipe 9 indicated by a two-dotted line in FIG. 1. The oil flows to an oil pan 5P formed in a lower portion of the transmission 5. The oil is pumped by an oil pump (not shown) mounted inside the oil pan 5P to outflow from the oil pan 5P to components to be lubricated, such as the cylinder head 1H. When the motorcycle 20 banks to the right or to the left, the oil reserved in the oil pan 5P makes contact with gears or shafts positioned thereabove. Because the gears or the shafts that make contact with the oil rotate at a speed lower than that of the crankshaft 1D of the engine 1, for example, at a speed that is about ½ to ⅓ of those of the crankshaft 1D, mechanical loss caused by the contact with the oil is significantly reduced in contrast to the conventional in-line engine. In other words, since the crankshaft 1D rotating at a high speed is positioned above and distant from the oil reserved in the oil pan 5P in the engine 1, the crankshaft 1D or a crankweb (not shown) does not substantially make contact with the oil reserved in the oil pan 5P, when the motorcycle 20 banks greatly to the right or to the left during cornering or the like. As a result, mechanical loss is significantly reduced. Therefore, unlike in the conventional engine illustrated in FIG. 12, it is not necessary to provide a separating wall 100 or the like to isolate the returned oil from the rotatable components such as the crankshaft 1D or the crankweb.

Figure 7:
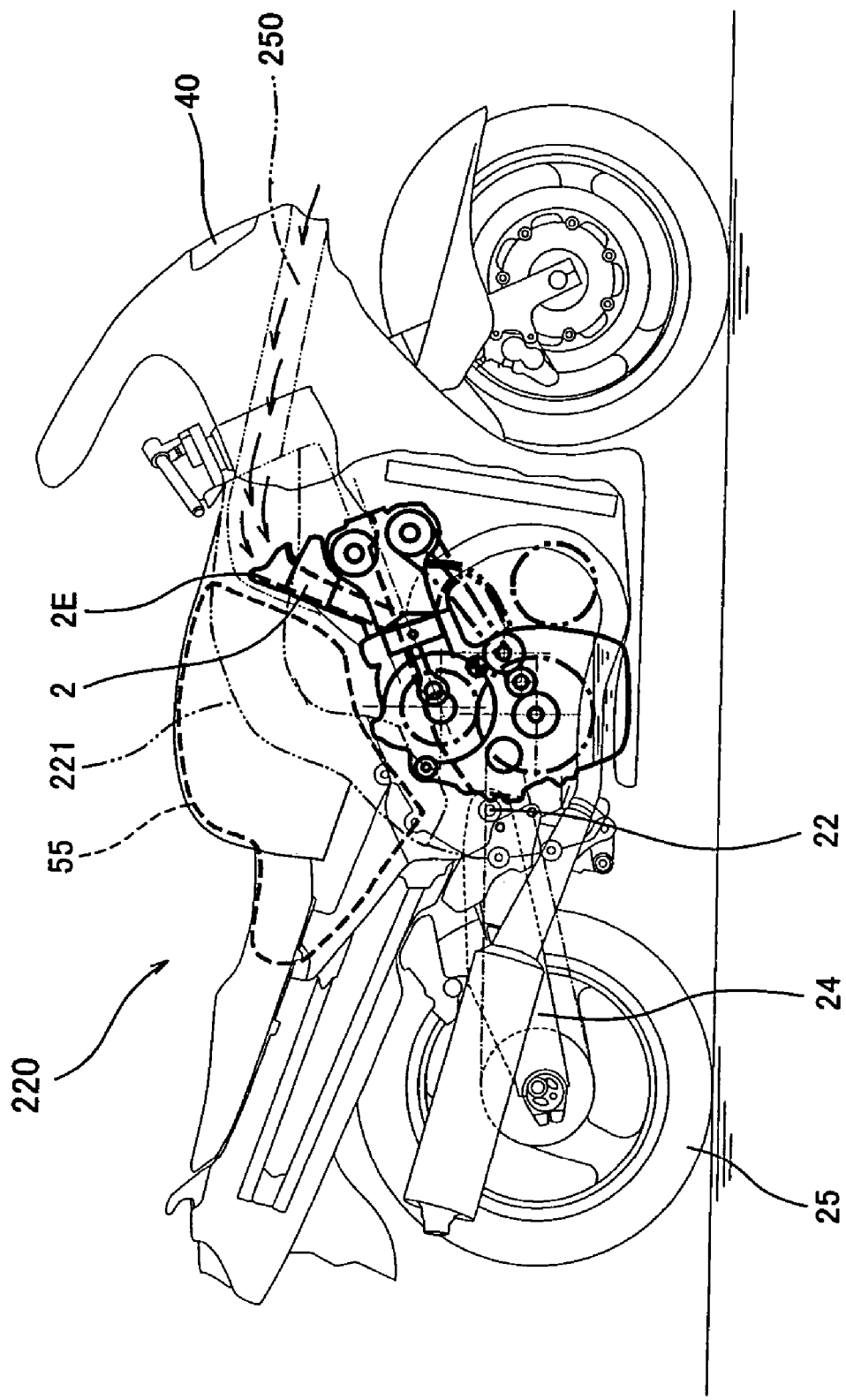
FIG. 7 is a side view of a motorcycle having a frame different from that of the motorcycle of FIG. 4, in which the engine of the present invention is mounted.

In this embodiment, the motorcycle 20 has a double cradle type (or twin tube type) main frame including the right and left frame members branching from the head pipe. The engine 1 may alternatively be mounted in a motorcycle having a monocoque frame. FIG. 7 shows a motorcycle 220 having a monocoque frame 221.

The monocoque frame 221 is of a box-shape that has a large hollow space therein. An air box of an air-intake system of the engine 1 may be formed in the hollow space, and an intake pipe 2E of the air-intake device 2 may protrude into the hollow space to open inside the air box. An air passage 250 is formed to extend from the air box in the hollow space to a region under a head lamp 40 to enable fresh air flowing from forward to be actively introduced into the air box. In the engine 1 of this embodiment, as shown in FIG. 7, since an opening of the intake pipe 2E of the intake device 2 is oriented obliquely forward, a front end of the fuel tank 55 can be positioned immediately behind the air-intake device 2. For this reason, the fuel tank 55 is able to be extended further forward in contrast to the motorcycle in which the conventional engine is mounted. This increases a volume of the fuel tank 55.

Figure 6A:
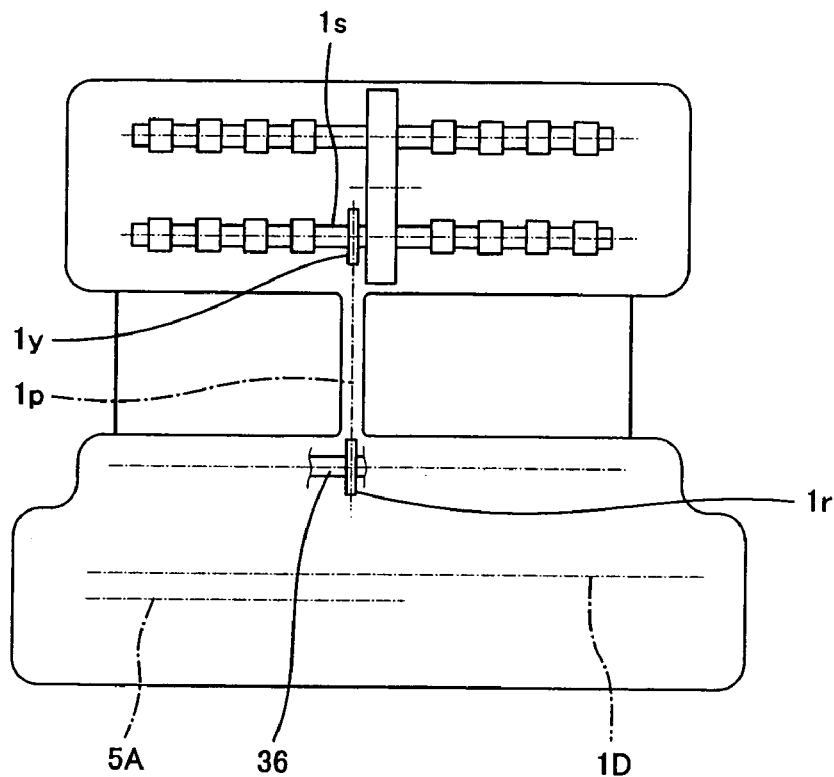
FIG. 6A is a front view of an engine of FIG. 6B, a cylinder head cover of which is removed.
Figure 6B:
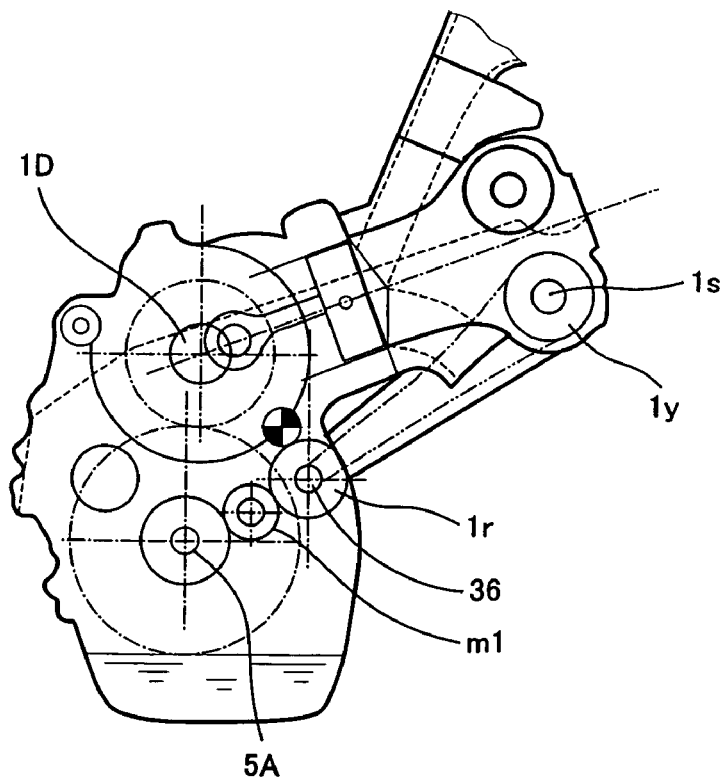
FIG. 6B is a side view schematically showing an engine equipped with a camshaft drive system different from that illustrated in FIG. 1.

Turning again to FIG. 1, a driven cam sprocket 1y is mounted on one end of a camshaft 1s in the interior of the cylinder head 1H, a drive cam sprocket 1r corresponding to the driven cam sprocket 1y is mounted on the crankshaft 1D, and a drive chain 1p is installed around the driven cam sprocket 1y and the drive cam sprocket 1r so that a drive force is transmitted from the crankshaft 1D to the camshaft 1s through the drive chain 1p. Alternatively, as shown in FIGS. 6A and 6B, the driven cam sprocket 1y may be mounted on a center region in a longitudinal direction of the camshaft 1s, the drive cam sprocket 1r may be mounted on a cam drive shaft 36 disposed in parallel with the input shaft 5A of the transmission 5, and the drive chain 1p may be installed around the driven cam sprocket 1y and the drive cam sprocket 1r. In this construction, the length of the crankshaft 1D can be reduced. In addition, a cam chain tunnel formed at a side end of the engine E may be omitted. This eliminates a part protruding laterally from the engine 1. In this construction, a chain case covering the drive chain 1p may serve as a return passage of the oil, instead of the return pipe 9. As shown in FIG. 6B, a drive force is transmitted from the crankshaft 1D to the camshaft 1s through the input shaft 5A connected to the crankshaft 1D via a pair of gears and the cam drive shaft 36 connected to the input shaft 5A via a pair of gears and an intermediate gear.

Figure 3:
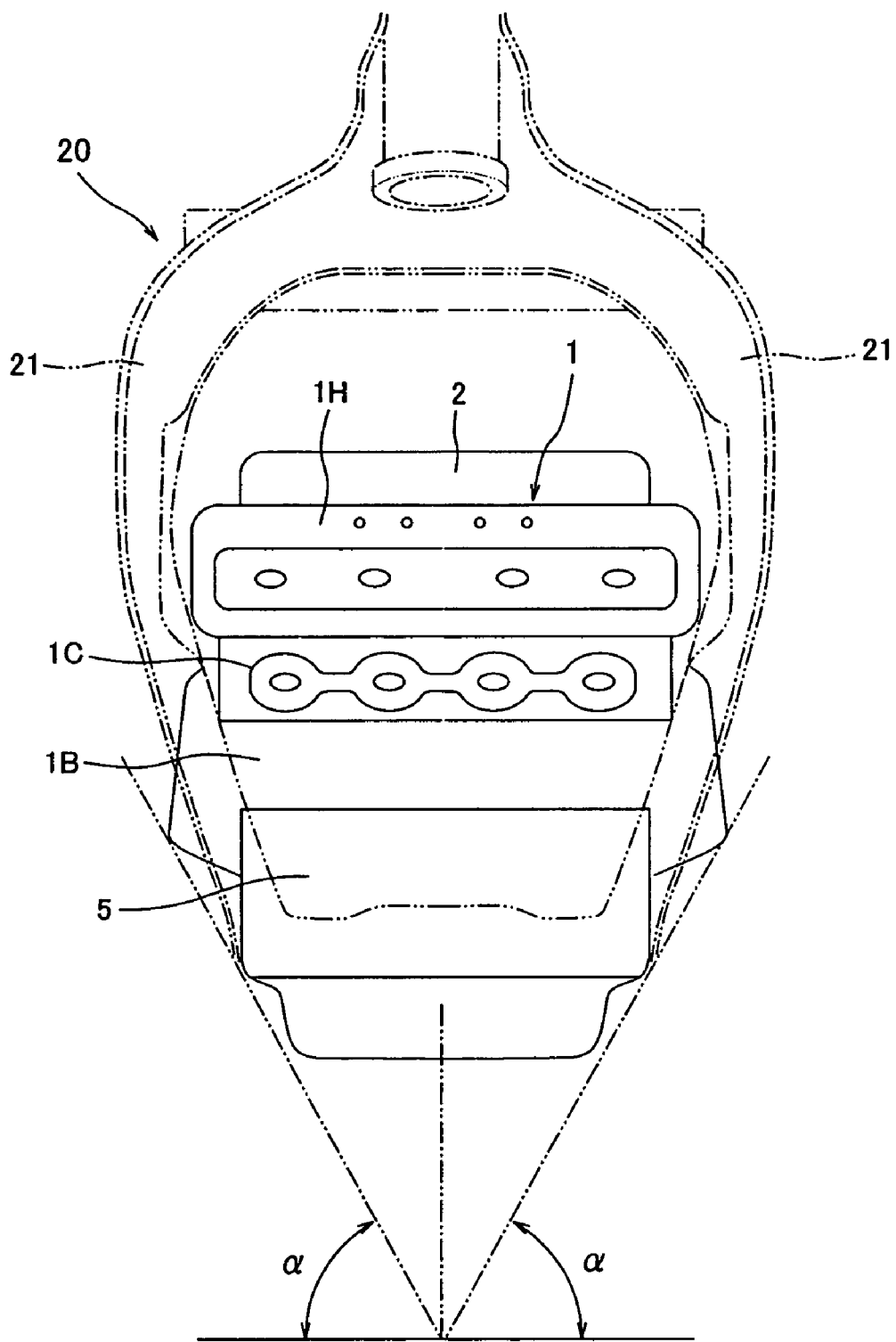
FIG. 3 is a front view schematically showing a construction of the engine of FIG. 1.
Figure 5:
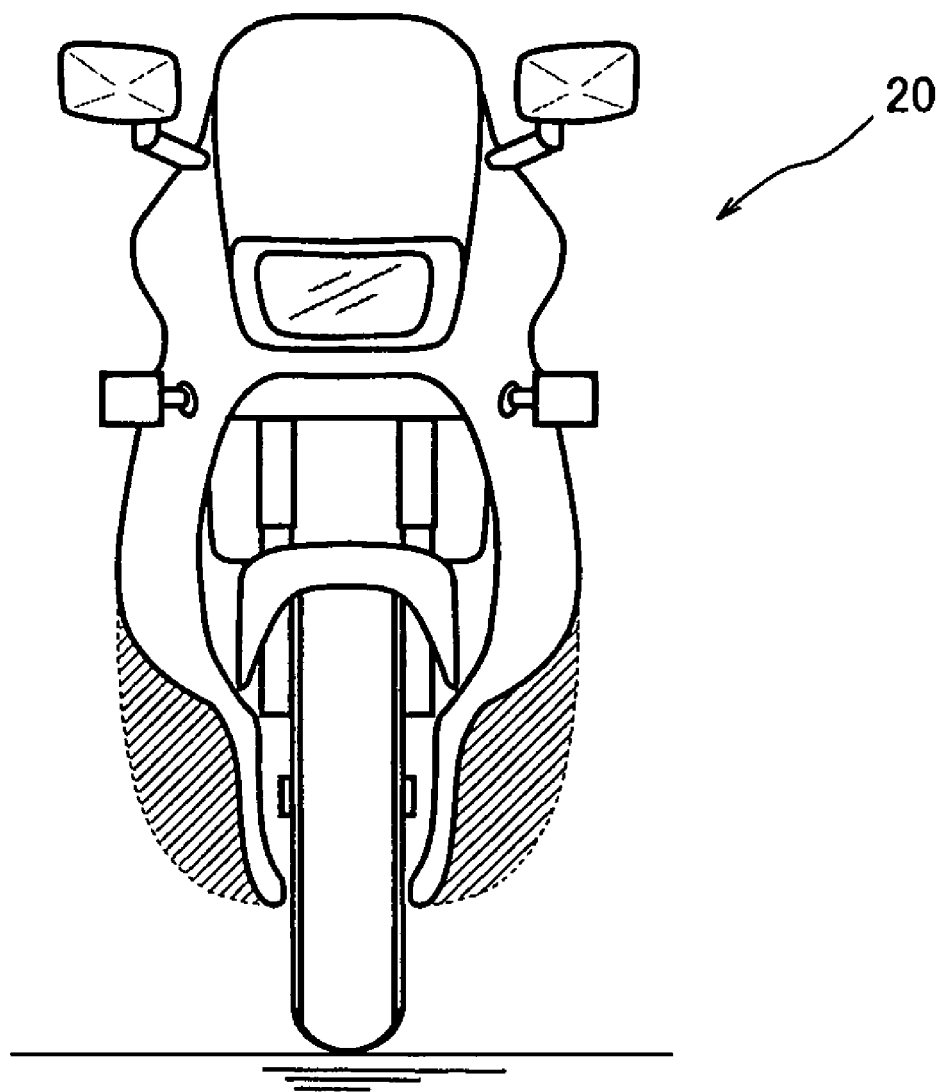
FIG. 5 is a front view of the motorcycle of FIG. 4.
Figure 12:
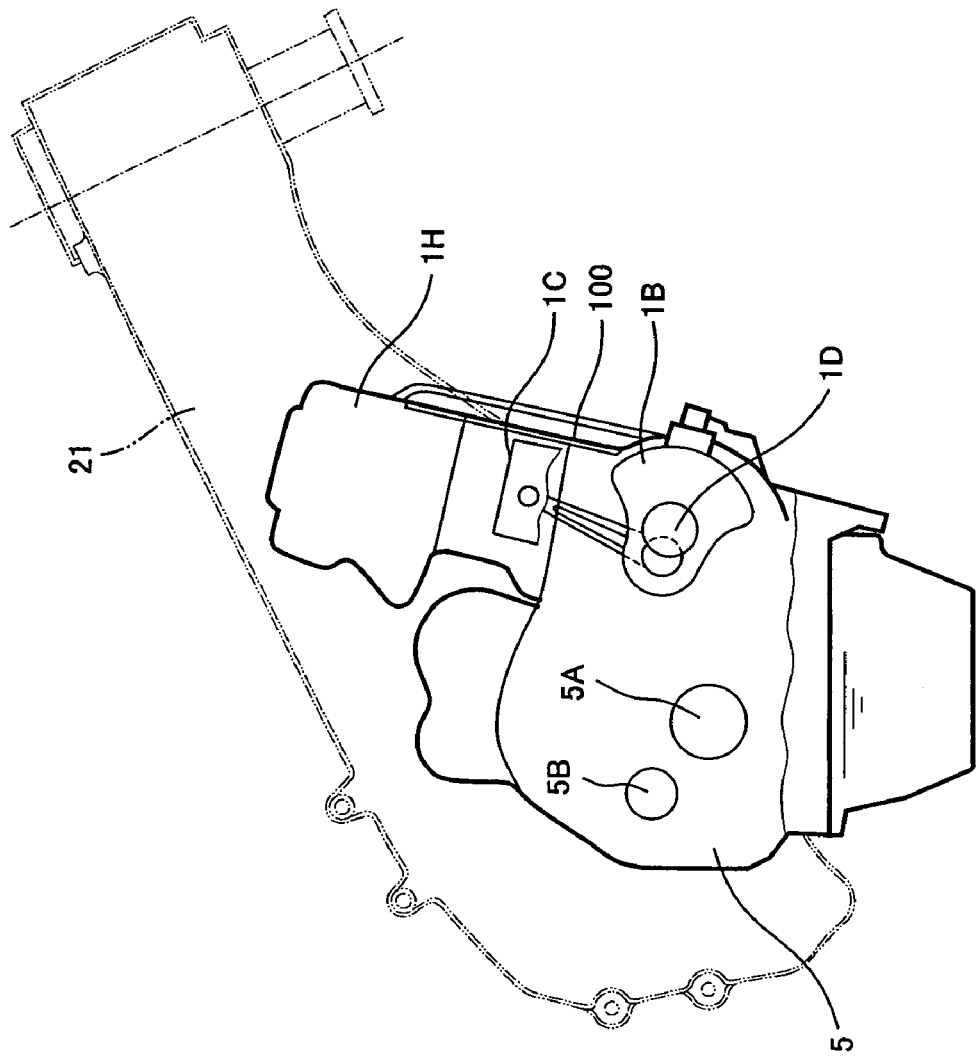
FIG. 12 is a side view schematically showing a construction of a conventional engine for the motorcycle.
Figure 13:
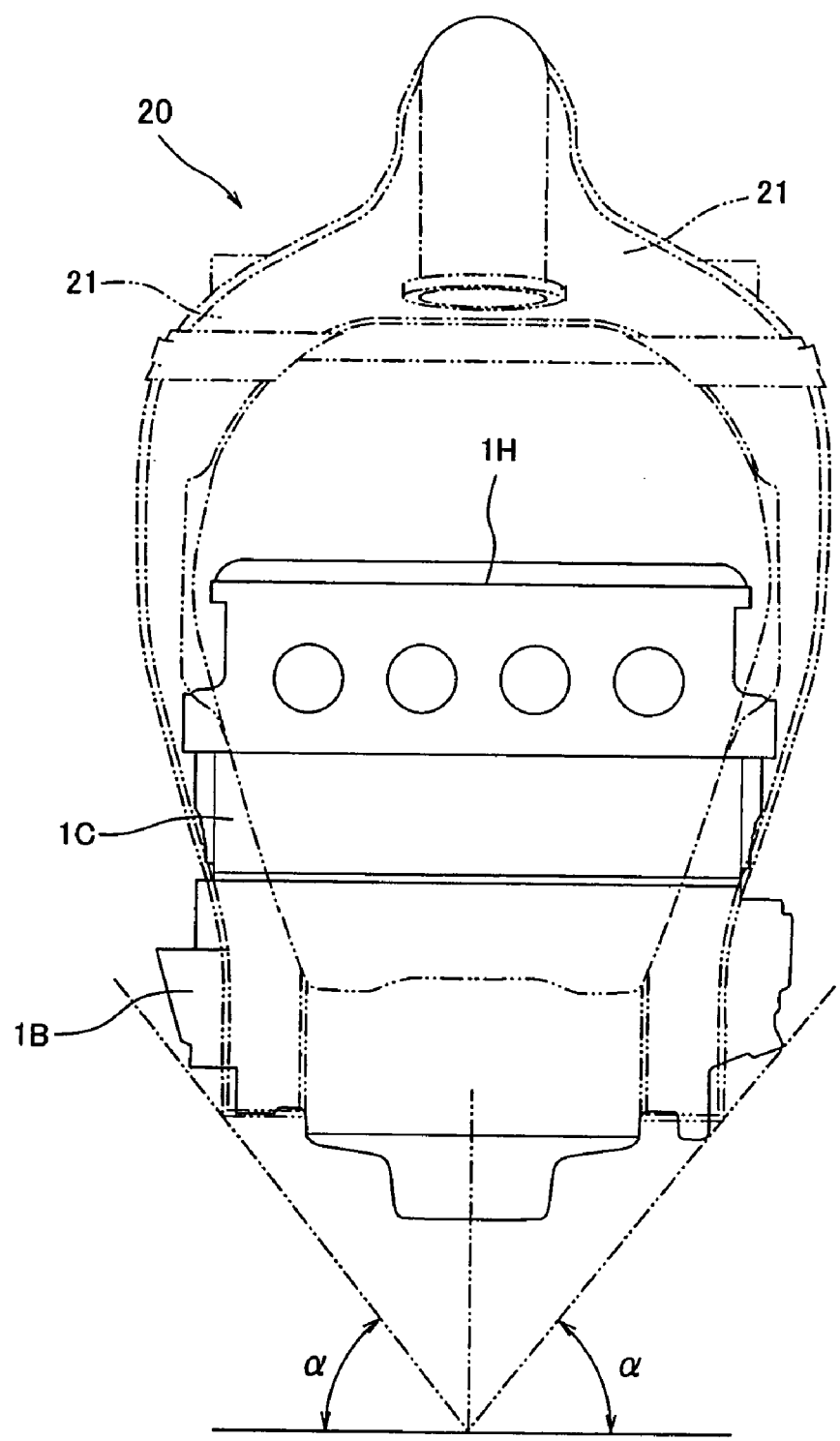
FIG. 13 is a front view schematically showing the conventional engine of FIG. 12.

In the motorcycle equipped with the engine 1 of this embodiment, as can be seen from FIG. 3 or FIG. 5, a projected area of the engine 1 as viewed from forward, namely, a frontal-projected area of the engine 1 is smaller than that of the conventional transverse-mounted in-line four-cylinder engine of FIG. 12. As can be clearly seen from comparison between FIG. 3 and FIG. 13 illustrating the front view of the conventional engine, the frontal-projected area is in this embodiment, 20 to 30% smaller than that of the conventional engine. For this reason, air resistance of the motorcycle during the travel can be reduced. In FIGS. 12 and 13, the same reference numbers denote the same or corresponding parts for the sake of comparison.

In this embodiment, if the axial direction, namely, the axis L1 of the cylinder 1C is substantially horizontal, a region including the cylinder head 1H that tends to elevate in temperature is located forward relative to the crank chamber 1B or the like in the direction in which the motorcycle 20 is traveling, and is cooled effectively by the cooling air flowing from forward toward the motorcycle 20. In an air-cooled engine, by tilting the cylinder 1C slightly upward on the cylinder head H side, the cooling wind directly contacts the cylinder 1C.

Further, in this embodiment, when the rider banks the motorcycle 20 during cornering, the crank chamber 1B which has a largest width is positioned higher than that of conventional engine 1 of FIG. 13. As can be seen from comparison between FIG. 3 and FIG. 13, a larger bank angle α is obtained in the motorcycle 20 of this embodiment. In the transverse-mounted in-line four-cylinder engine, which has a large width, and which is typically employed in the high-speed motorcycle, the bank angle tends to be small, whereas in the engine 1 of the present invention, a larger bank angle α is obtained, as illustrated in FIG. 3.

In the engine 1 of this embodiment, the cylinder head 1H and the crankshaft 1D, which has a large weight, are positioned near a center of gravity M (see FIG. 1) of the engine 1. In this construction, since an inertia moment caused by rotation of the crankshaft 1D is generated near the center of gravity M of the engine 1, the rider is able to easily change the attitude of the motorcycle 20 in the lateral direction of the vehicle body, namely, in a yawing direction, during cornering or slalom.

In the motorcycle 20 in which the engine 1 is mounted as described above, the reciprocation direction (direction of the line L1) of the piston is not the vertical direction of the motorcycle 20, the rider is less likely to feel the reciprocation of the piston. In particular, by configuring the engine 1 such that the reciprocation direction of the piston substantially conforms to the longitudinal direction of the main frame 21, the vibration of the engine 1 is effectively reduced by the main frame 21, so that the rider does not feel the vibration of the engine 1. Therefore, in some cases, the counterweight (balancer device) for reducing the vibration generated in the reciprocation direction of the piston may be omitted. As a result, a lightweight engine is achieved. This is particularly advantageous for engines of motorcycles for which many attempts have been already made to reduce weight. In addition, since the weight of the movable components of the engine 1 is reduced by omitting the counterweight, responsiveness of the engine 1 can be effectively improved.

Further, in this embodiment, since the vertical dimension of the engine 1 can be decreased, the air-intake device 2 can be positioned above the engine 1 to enable fresh air (or air-fuel mixture) to flow straight downward to be supplied to the intake port 1i. As a result, air-intake efficiency of the engine 1 is increased.

Figure 8:
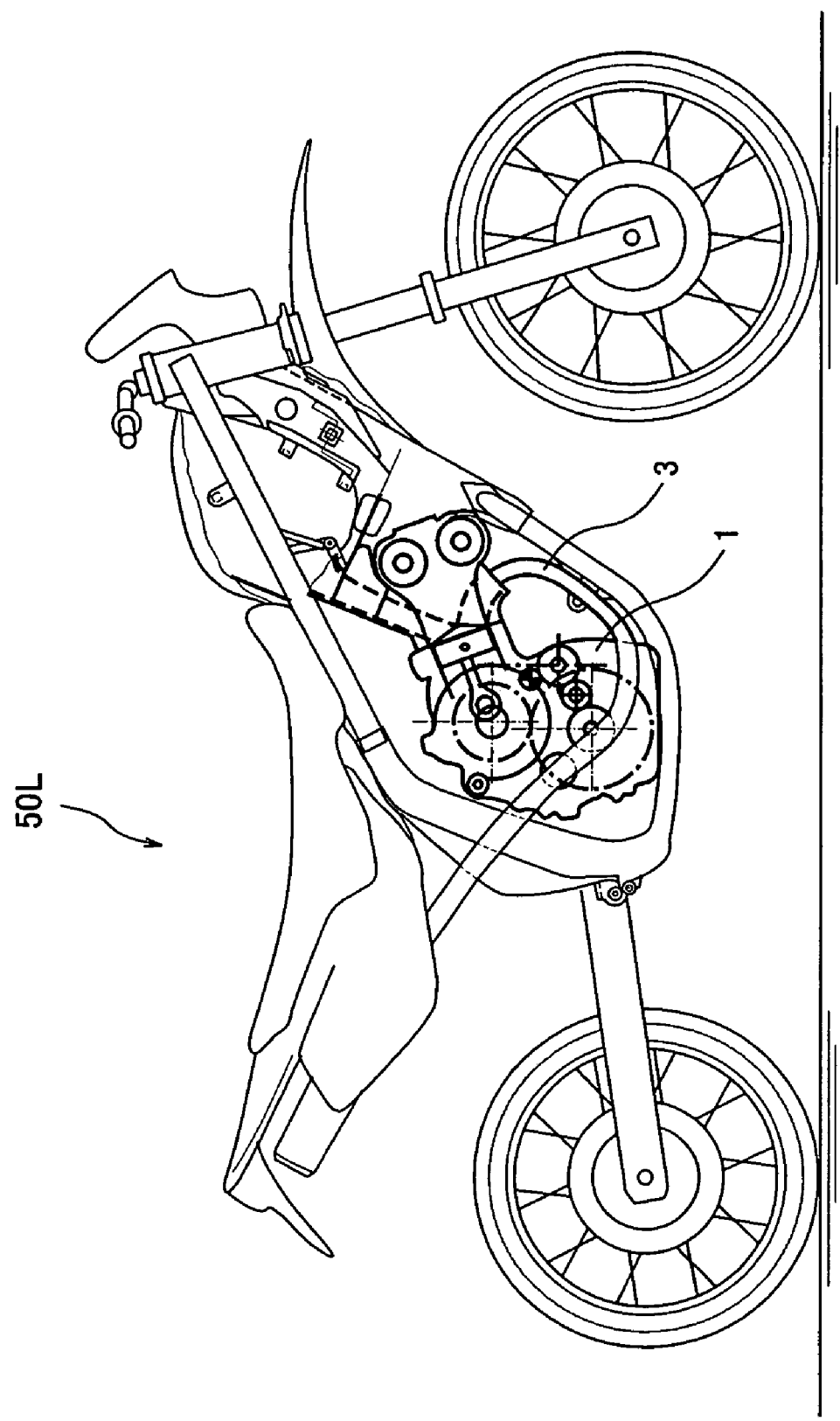
FIG. 8 is a side view of an off-road type motorcycle in which the engine of the present invention is mounted.

Because of the reduced vertical dimension of the engine 1, a minimum ground clearance of the vehicle body of the motorcycle 20 can be increased, and correspondingly the bank angle can be increased. This is advantageous to an off-road motorcycle (off-roader) 50L illustrated in FIG. 8 or a motocross motorcycle. In FIG. 8, 1 denotes an engine and 3 denotes an exhaust pipe.

In the motorcycle 20 equipped with the engine 1 of this embodiment, as shown in FIG. 1, a space is formed below the cylinder 1C and the cylinder head 1H oriented substantially horizontally in a side view, i.e., forward of the transmission 5. This space is located near the exhaust pipe 3. If a turbocharger 7, which is an auxiliary device of the engine, is disposed in this space, rather than the generator 6, handling of the exhaust pipe 3 with respect to the turbocharger 7 becomes easy. To be specific, a connecting configuration of the exhaust pipe 3 with respect to the turbocharger 7 becomes simple and a connecting length thereof is reduced. Alternatively, a catalytic device for cleaning the exhaust gas, which is an auxiliary device, may be disposed in the space. In that case, the exhaust gas flowing near the exhaust port 1e, which is elevated in temperature, is cleaned effectively. It will be appreciated that both the turbocharger 7 and the catalytic device may be disposed in the space. In a further alternative, auxiliary devices such as a starter motor, a battery, an oil cooler, an oil filter, an air filter device, or an oil tank, rather than the turbocharger 7 and the catalytic device, may be disposed in the space.

As shown in FIG. 1, in the motorcycle 20 of this embodiment, since the cylinder 1C of the engine 1 is disposed behind the radiator 8 to be sufficiently spaced apart from the radiator 8, the flow of the cooling air passing through the radiator 8 is not interrupted. Because of the smooth flow of the cooling air, the radiator 8 is able to achieve high cooling efficiency.

As described above, in the engine 1 in which the exhaust port 1e is formed on the lower region of the cylinder head 1H, the exhaust pipe 3 is curved with a large curvature radius and with a small bending angle as illustrated in FIG. 1. Thereby, the pressure loss of the exhaust pipe 3 can be decreased. As a result, the exhaust efficiency of the engine 1 can be increased.

Figure 11:
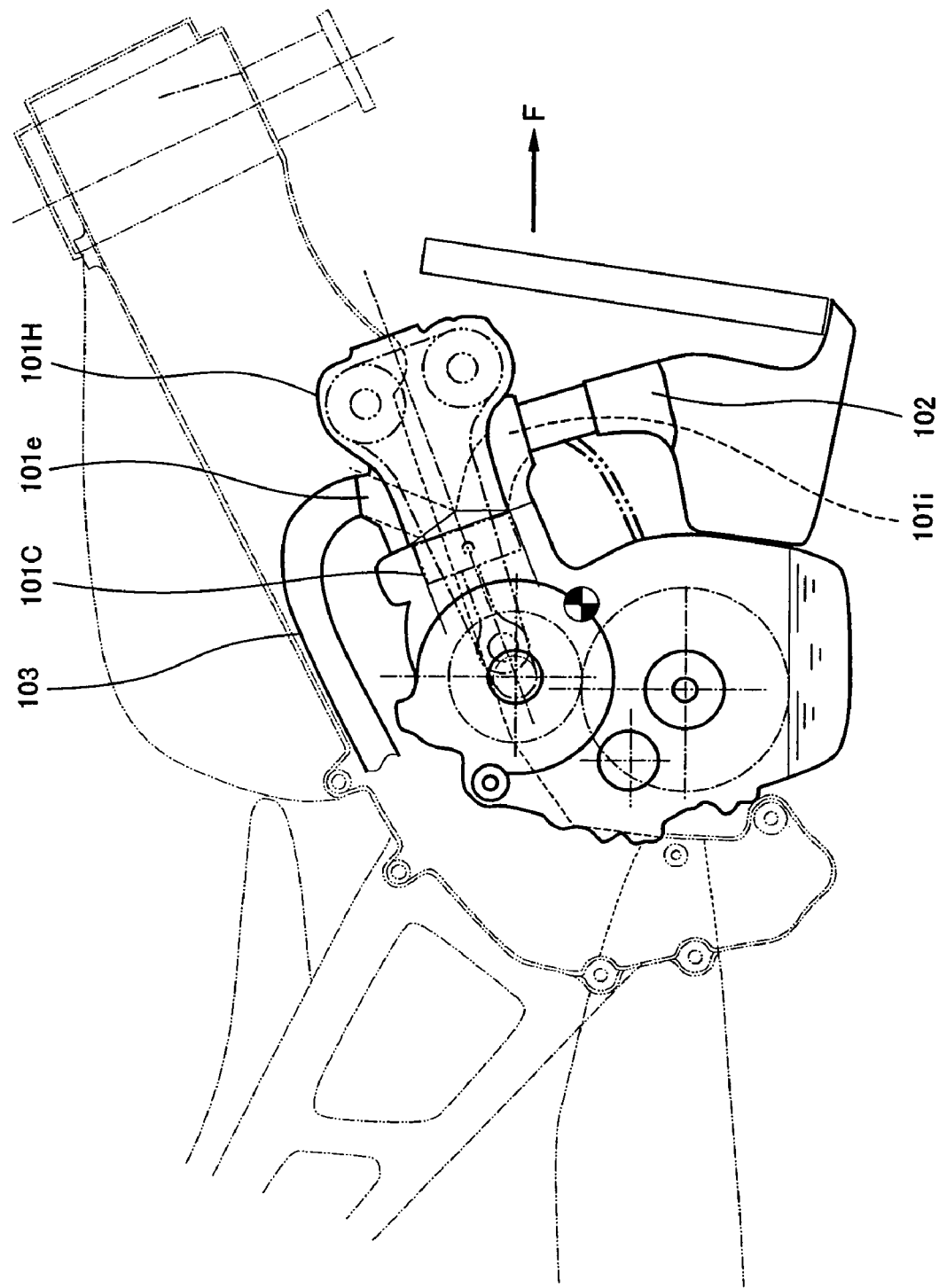
FIG. 11 is a side view schematically showing a construction of the engine according to another embodiment.

As shown in FIG. 11, in another embodiment, an exhaust port 101e may be formed on an upper region of a cylinder head 101H and an intake port 101i may be formed on a lower region of the cylinder head 101H. In this construction, an exhaust pipe 103 having a downstream end portion extending rearward can be curved with a large curvature radius and with a small bending angle, and an air-intake device 102 can be disposed in a space formed below the cylinder head 101C and the cylinder head 101H so as to be located near the intake port 101i. Therefore, air-intake efficiency and exhaust efficiency of the engine 1 can be increased. In other respects, the engine of this embodiment is similar to the engine 1 of FIG. 1.

Whereas in the above embodiment, the cylinder 1C and the cylinder head 1H of the engine 1 extend forward from the crank chamber 1B, they may alternatively extend rearward. In the engine 1 having such a construction, a wider space is formed behind the radiator 8, and the exhaust pipe 3 can be easily guided to a rear end portion of the motorcycle 20. In addition, the fresh air blowing from forward can be easily introduced to the air-intake device 2.

Figure 9:
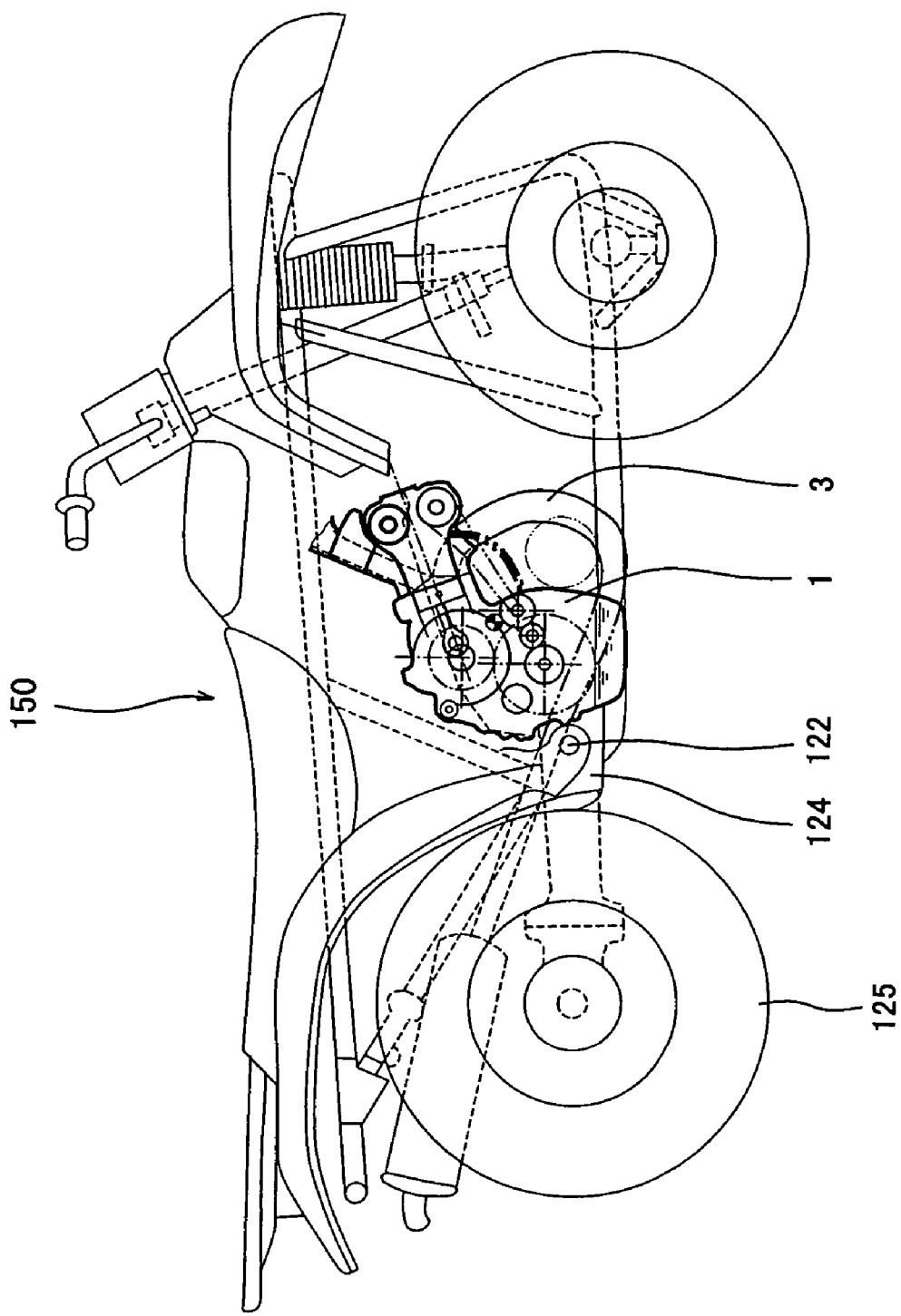
FIG. 9 is a side view of an all terrain vehicle in which the engine of the present invention is mounted.

The above mentioned engine 1 can be mounted in other leisure vehicles such as an all terrain vehicle. Turning to FIG. 9, an ATV 150 is illustrated. As in the case of the motorcycle 20, the engine 1 of FIG. 1 is mounted in the ATV 150 in such a manner that a crank chamber is disposed on an upper side of a transmission chamber of the transmission and an axial direction, that is, an axis of a cylinder is oriented in a substantially longitudinal direction of a vehicle body of the ATV 150. In this construction, the engine 1 is positioned forward of a pivot shaft 122 of a swing arm 124 configured to pivotally support a rear wheel 125 of the ATV 150. Since height of the engine 1 is lowered in the ATV 150 constructed above, a minimum ground clearance of the ATV 150 can be increased. In FIG. 9, 3 denotes an exhaust pipe.

The engine 1 can be mounted in other leisure vehicles such as a utility vehicle and personal watercraft (PWC).

Figure 10:
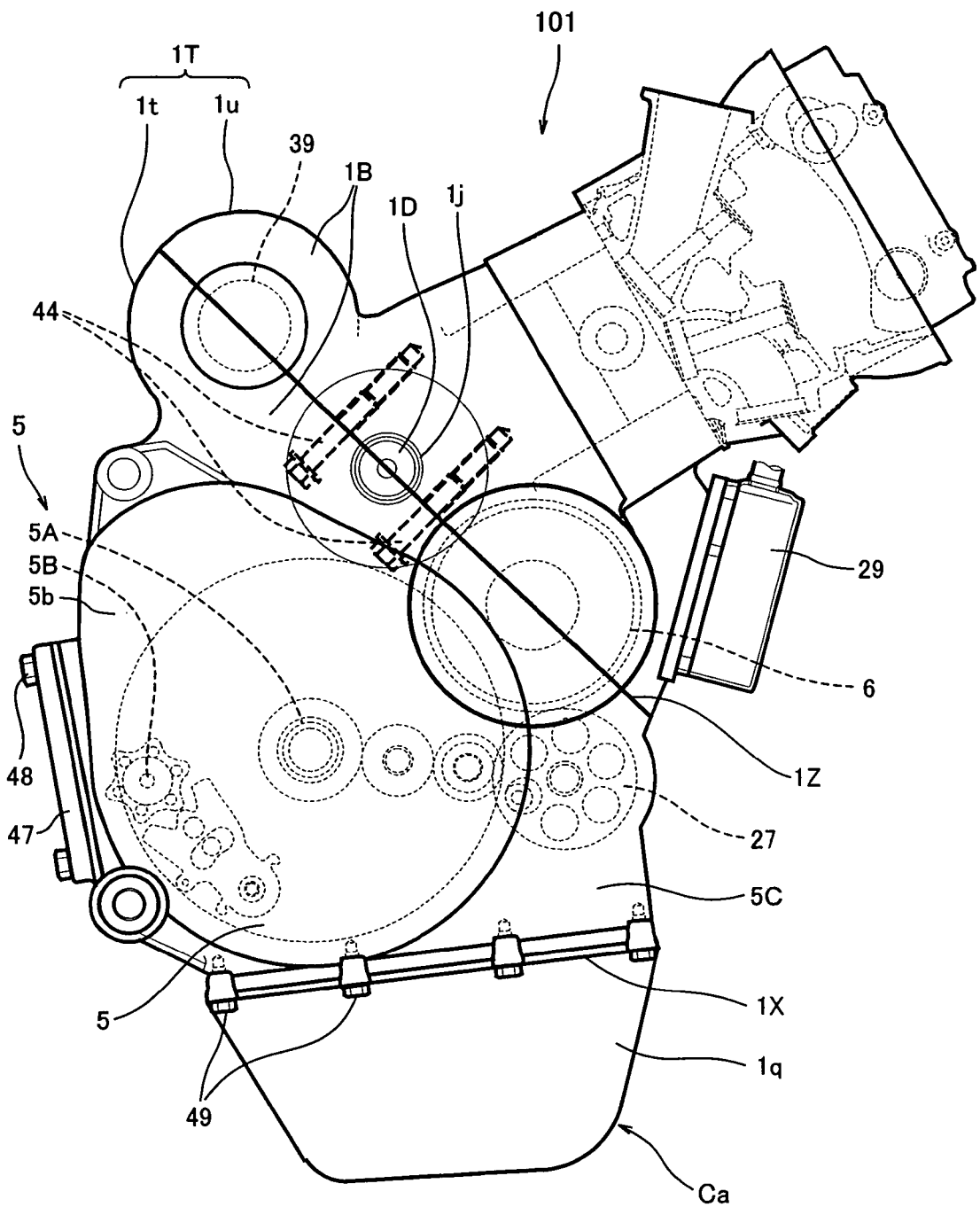
FIG. 10 is a side view of the engine according to another embodiment, enabling easy assembly and disassembly of the engine.

Turning to FIG. 10, in an engine 101 having a construction identical to those of the above mentioned embodiments and constructed such that the crank chamber 1B in which the crankshaft 1D is disposed and the transmission chamber 5C in which the transmission unit is disposed are spatially connected to each other, a crankcase portion 1T of the case Ca forming the outer shell of the crank chamber 1B may be provided with a parting plane 1Z to divide the crankcase portion 1T into an upper case 1u and a lower case 1t, a transmission case portion 5b of the case Ca forming the outer shell of the transmission chamber 5C may be integral with a lower part of the lower case 1t, and a lid member 47 or the like may be removably attached to the transmission case portion 5b of the case Ca.

In the above constructed engine 101, rotational shafts of the crankshaft 1D, a generator 6, and a balancer 39 are mounted to the crankcase portion 1T of the case Ca by bearings. As shown in FIG. 10, the parting plane 1Z is formed in the crankcase portion 1T of the case Ca to extend centers of the rotational shafts of the crankshaft 1D, the generator 6, and the balancer 39. In addition, an opening is formed at a rear end surface of the transmission case portion 5b of the case Ca to face inside of the crank chamber 1B and the transmission chamber 5C, and the lid member 47 is removably attached to the opening by bolts 48.

The engine 101 constructed above is easily assembled and disassembled. To be specific, during assembly, the lid member 47 is removed, and the rotational shafts of the crankshaft 1D, the generator 6, and the balancer 39 are positioned with respect to the lower case 1t or the upper case 1u, in which state, the lower case 1t and the upper case 1u are coupled to each other. Then, bolts 44 are tightly threaded by using a tool through the opening of the lid member 47 to enable the lower case 1t to be threadedly secured to the upper case 1u. With the lower case 1t secured to the upper case 1t, the rotational shafts of the crankshaft 1D, the generator 6, and the balancer 39 are rotatably mounted to the crankcase portion 1T of the case Ca by bearings. Thereafter, the lid member 47 is attached to close the opening by the bolts 48, thus completing assembly. The engine 101 is able to be disassembled in a reversed order.

As shown in FIG. 10, a parting plane 1X is formed at an upper end of an oil reservoir 1q formed at a lower end portion of the engine 101, and the oil reservoir 1q is removably attached to a lower end of the transmission case portion 5b of the case Ca integral with the lower case 1t by a plurality of bolts 49. In this construction, by removing the bolts 49, the oil reservoir 1q is removed to enable an operator to visually check the interior of the transmission 5 from below. In FIG. 10, reference symbol 5A denotes an input shaft of the transmission 5, 5B denotes a change drum shaft, 27 denotes a water pump, and 29 denotes an oil cooler.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A motorcycle equipped with an engine comprising:
 a crank chamber in which a crankshaft with a drive gear is disposed;
 a transmission chamber in which a transmission unit of the vehicle is disposed, the transmission unit having an input shaft with a driven gear and a drive gear that is coupled to the crankshaft via the drive gear of the crankshaft and the driven gear of the input shaft, and that is configured to receive a rotation transmitted from the crankshaft, to be driven by the crankshaft, and having an output shaft with a driven gear that is coupled to the input shaft via the drive gear of the input shaft and the driven gear of the output shaft and is configured to receive a rotation transmitted from the input shaft, the input shaft being positioned substantially immediately below the crank shaft, and the output shaft being disposed farther than the input shaft from the cylinder;

a cylinder extending forward from the crank chamber in the motorcycle;

a cylinder head attached to the cylinder; and a main frame of the motorcycle configured to extend above the engine along the longitudinal direction of the motorcycle;

wherein the crank chamber is located above the transmission chamber, and the cylinder is disposed in such a manner that an axial direction thereof is oriented in a range substantially from a horizontal direction to a direction in which the main frame extends, such that the cylinder is disposed in an orientation between horizontal and inclined with a cylinder head side higher and the axial direction of the cylinder oriented in the direction in which the main frame extends.

2. The motorcycle according to claim 1,
wherein the cylinder is disposed in such a manner that the axial direction thereof is substantially horizontal.

3. The motorcycle according to claim 1,
wherein the cylinder is disposed in such a manner that the axial direction thereof is substantially parallel to a longitudinal direction of the main frame of the motorcycle in a side view.

4. The motorcycle according to claim 3, further comprising:
an auxiliary device of the engine that is disposed in a space formed below the cylinder head and forward of the transmission chamber.

5. The motorcycle according to claim 4,
wherein the auxiliary device is at least one of a catalytic device for cleaning an exhaust gas emitted from the engine, a turbocharger, a starter motor, a generator, a battery, an oil cooler, an oil filter, an air filter device, and an oil tank.

6. The motorcycle according to claim 3, further comprising:
an air-intake device disposed above the cylinder head.

7. The motorcycle according to claim 6,
wherein the main frame of the motorcycle includes a monocoque frame having a hollow space in which an air box is disposed.

8. The motorcycle according to claim 3, wherein a crankshaft of the engine is positioned forward of a pivot shaft of a swing arm of the motorcycle.

9. The motorcycle according to claim 1, wherein the engine is an in-line multi-cylinder four-cycle engine.

10. The motorcycle according to claim 1,
wherein an exhaust port is formed on a lower region of the cylinder head and an intake port is formed on an upper region of the cylinder head.

11. The motorcycle according to claim 1,
wherein an exhaust port is formed on an upper region of the cylinder head and an intake port is formed on a lower region of the cylinder head.

12. The motorcycle according to claim 1,
wherein the transmission chamber and the crank chamber located thereabove are formed in a case having a transmission case portion forming an outer shell of the transmission chamber and a crankcase portion forming an outer shell of the crank chamber and are spatially connected to each other;

wherein an oil reservoir of the engine is removably attached to a lower end of the transmission case portion to close an opening formed in the lower end;

wherein a lid member is removably attached to an opening for use to insert a tool during assembly that is formed on a rear portion of a side wall of the transmission case portion of the case so as to face rotational shafts including the input shaft and the output shaft of the transmission unit in the transmission case portion of the case; and wherein the crankcase portion of the case has a parting plane that divides the case into an upper part of the case and a lower part of the case, the parting plane being tilted forward and downward in a side view and configured to pass through a center axis of the crankshaft.

13. The motorcycle according to claim 1, the engine further comprising:
a camshaft that is configured to drive engine valves and is disposed in the cylinder head so as to extend in parallel with an axis of the crankshaft, the camshaft having a driven cam sprocket mounted on a center region in a longitudinal direction thereof;

a cam drive shaft which is disposed in a case having a transmission case portion forming an outer shell of the transmission chamber and a crankcase portion forming an outer shell of the crank chamber and is configured to be driven by the crankshaft, the cam driveshaft having a drive cam sprocket for driving the driven cam sprocket and disposed to be spaced forward toward the cylinder apart from the crankshaft so as to extend in parallel with the crankshaft, and a chain installed around the drive cam sprocket and driven cam sprocket;

wherein the engine is an in-line multi-cylinder four-cycle engine.

14. The motorcycle according to claim 13, wherein the drive force is transmitted from the crankshaft to the cam drive shaft through the input shaft of the transmission.

* * * * *